March 15, 1960   G. F. FARLEY   2,928,372
DOG FEEDING DISH
Filed Feb. 26, 1958

Inventor
George F. Farley
Attorney

2,928,372
DOG FEEDING DISH

George F. Farley, Elm Grove, Wis., assignor to Spincraft, Inc., Milwaukee, Wis., a corporation of Wisconsin Application February 26, 1958, Serial No. 717,696

1 Claim. (Cl. 119—61)

This invention relates to feeding dishes for pets, and has as its purpose to provide an improved dog feeding dish.

The eating habits of dogs, regardless of how well behaved they may be, leave much to be hoped for. Spilled food due to dishes being tipped over or picked up by the dog is a common source of irritation. Another is food thrown out of the dish as a result of the energetic manner in which most dogs go about lapping up their food. These and many other irritating experiences long ago led to the hope that someone would devise a dog feeding dish which could not be tipped over, which could not be picked up by the dog, and which was so designed that there would be small likelihood of the contents of the dish being thrown out as a result of the dog lapping up his food.

The present invention achieves all of these objectives and, in addition, provides a dog feeding dish which is indestructible.

With the above and other objects in view which will appear as the description proceeds, this invention resides in the novel construction, combination and arrangement of parts substantially as hereinafter described and more particularly defined by the appended claim, it being understood that such changes in the precise embodiment of the hereindisclosed invention may be made as come within the scope of the claim.

Figure 1:
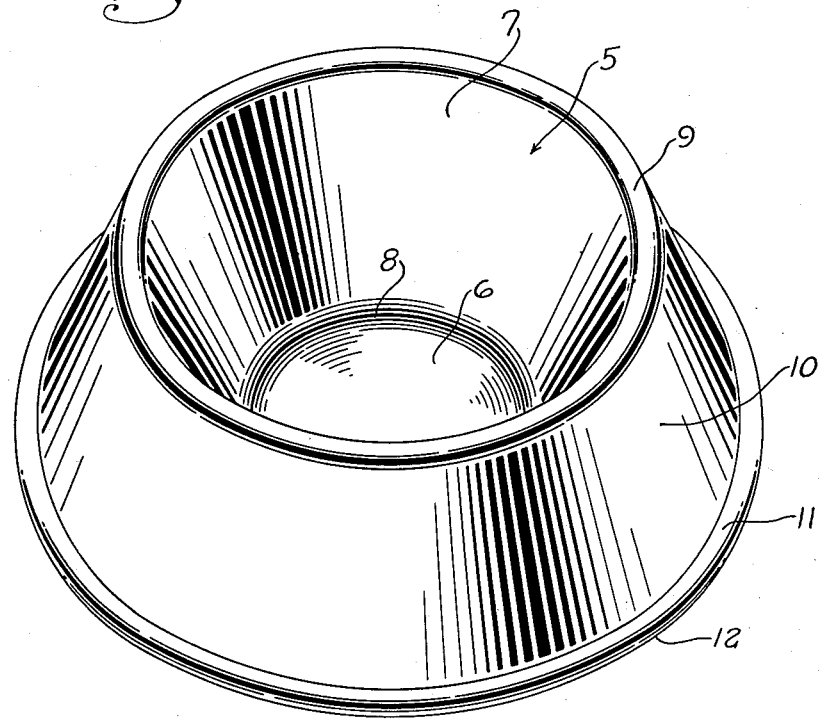
Figure 2:
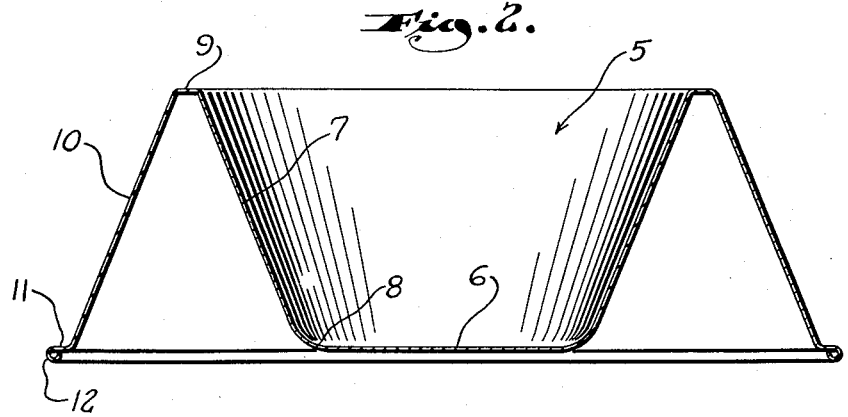

The accompanying drawing illustrates one complete embodiment of the invention constructed according to the best mode so far devised for the practical application of the principles thereof, and in which:

Figure 1 is a perspective view of a dog feeding dish embodying this invention; and Figure 2 is a cross sectional view through the dish.

As shown in the drawing, the dog feeding dish of this invention is one integral unit. It is made by the metal spinning process, which means that it is formed from a single piece of sheet metal which, for best results, is stainless steel. The dish has an upwardly opening central bowl portion, indicated generally by the numeral 5 and defined by a flat bottom wall 6 and a sloping side wall 7. The junction between the bottom and side walls is formed by a fillet 8 of relatively small radius, and the sloping side wall diverges uniformly from this fillet to its upper edge, where a flat upper rim 9 joins it with a skirt portion 10. The skirt portion slopes downwardly and outwardly with a uniform divergence to its lower edge where it merges into an outwardly projecting flange 11. The peripheral of this flange is curled downwardly and inwardly to provide a stiffening bead 12. Attention is directed to the fact that the underside of the bead 12 lies in a single plane which is spaced downwardly below the bottom 6 of the bowl portion. Accordingly, the bead 12 forms a broad base upon which the dish sets.

The slope of the sides of the bowl and skirt portions is such that the included angle therebetween is not less than about 40°, and preferably the angle of the slope is substantially the same for both walls. This specific shape and relationship of these side walls assures maximum stability for the dish making it impossible for the dog to tip it over, but more important, the specified sloping sides together with the fact that being formed of stainless steel the surfaces thereof are smooth and hard, makes it impossible for a dog to bite the rim of the dish and pick it up.

Another important feature of this invention, resides in the fact that the bottom 6 of the bowl portion is flat and that the junction of the bottom and sides of the bowl is defined by a relatively small radius fillet. This makes it impossible for the dog to throw out the contents of the dish as he laps up his food.

Still another very desirable feature of the dish of this invention resides in the fact that the stiffening bead 12 at the periphery of the flange which projects from the lower edge of the skirt portion, is curved downwardly and inwardly. This not only achieves the desired stiffness and neat appearance, but does so without forming an upwardly opening groove or space in which dirt and food might collect.

From the foregoing description taken in connection with the accompanying drawing, it will be readily apparent that the dog feeding dish of this invention is a vast improvement over such dishes heretofore available.

What is claimed as my invention is:

As an article of manufacture, a dog feeding dish, fabricated from a single sheet of noncorrosive metal, comprising: an open-topped bowl portion having a substantially flat horizontal bottom and a smooth rigid sloping side wall which diverges upwardly substantially uniformly from its junction with the bottom to its upper edge at an angle of not less than about twenty degrees with respect to the axis of the bowl portion; an outer skirt portion having a smooth rigid sloping side wall which has its upper edge encircling and spaced from the top edge of the bowl portion and diverges downwardly substantially uniformly from its upper edge at an angle of not less than about twenty degrees with respect to the axis of the bowl portion; a pair of substantially horizontal upper and lower flanges, the upper flange providing a rim completely encircling the upper edge of the bowl portion and integrally concentrically joining the same with the top edge of the skirt portion, and the lower flange providing a base extending outwardly from and completely encircling the bottom of the skirt portion to enhance the stability of the dish; and a downwardly and inwardly curled bead on the periphery of the base flange, the underside of which lies in a substantially horizontal plane below the bottom of the bowl portion.

References Cited in the file of this patent

UNITED STATES PATENTS

| | | |
|---|---|---|
| 2,213,837 | Gill | Sept. 3, 1940 |
| 2,259,682 | Collins | Oct. 21, 1941 |